United States Patent [19]

Oka et al.

[11] Patent Number: 4,766,458
[45] Date of Patent: Aug. 23, 1988

[54] DEVELOPING APPARATUS FOR USE IN IMAGE-FORMING SYSTEM AND DEVELOPING PROCESS EMPLOYING SAID DEVELOPING APPARATUS

[75] Inventors: Tateki Oka, Toyohashi; Tomoaki Yokoyama, Toyokawa; Naoki Toyoshi, Toyohashi, all of Japan

[73] Assignee: Minolta Camera Kabushiki Kaisha, Osaka, Japan

[21] Appl. No.: 928,514

[22] Filed: Nov. 10, 1986

[30] Foreign Application Priority Data

Nov. 12, 1985 [JP] Japan ................... 60-254394
Nov. 13, 1985 [JP] Japan ................... 60-255784
Nov. 25, 1985 [JP] Japan ................... 60-265576
Nov. 25, 1985 [JP] Japan ................... 60-265577
Jun. 30, 1986 [JP] Japan ................... 61-154707

[51] Int. Cl.$^4$ .................. G03G 15/00; G03G 15/09
[52] U.S. Cl. .................. 355/3 DD; 118/657; 355/3 R
[58] Field of Search .......... 118/657, 658, 656, 661; 355/3 DD, 14 D

[56] References Cited

U.S. PATENT DOCUMENTS

| | | | |
|---|---|---|---|
| 4,267,248 | 5/1981 | Yamashita et al. | 430/122 |
| 4,447,518 | 5/1984 | Tubuchi et al. | 118/657 |
| 4,452,173 | 6/1984 | Tabuchi et al. | 355/3 DD |
| 4,486,089 | 12/1984 | Itaya et al. | 355/14 D |
| 4,552,451 | 11/1985 | Yamazaki et al. | 355/14 D |
| 4,557,992 | 12/1985 | Haneda et al. | 355/14 D |
| 4,568,955 | 2/1986 | Hosoya et al. | 355/3 DD |
| 4,607,933 | 8/1986 | Haneda et al. | 355/14 D |
| 4,624,559 | 11/1986 | Haneda et al. | 355/14 D |

Primary Examiner—R. L. Moses
Assistant Examiner—Ed Pipala
Attorney, Agent, or Firm—Burns, Doane, Swecker & Mathis

[57] ABSTRACT

A developing apparatus which includes a developing sleeve rotatably provided to confront an object to be developed, a magnet roller incorporated within the developing sleeve so as to be driven for rotation in the same direction as the developing sleeve, and a supply device for supplying developing material onto the peripheral surface of the developing sleeve. The developing apparatus is so arranged as to satisfy such conditions as $$D \cdot \pi \cdot Wsl > d1 \cdot p \cdot Wmg$$

where
D: developing sleeve diameter (mm)
Wsl: developing sleeve revolutions (rpm)
d1: the closest distance between the sleeve surface and the object to be developed
p: number of poles of the magnet roller
Wmg: revolutions of the magnet roller (rpm).

14 Claims, 9 Drawing Sheets

DEVELOPING APPARATUS FOR USE IN IMAGE-FORMING SYSTEM AND DEVELOPING PROCESS EMPLOYING SAID DEVELOPING APPARATUS

BACKGROUND OF THE INVENTION

The present invention generally relates to an image-forming system and more particularly, to a developing apparatus for forming a toner image on a photoreceptor or recording medium through employment of a magnetic brush, and a developing process employing said developing apparatus.

Conventionally, as a developing process of a magnetic brush type as referred to above, there has been well known a practice as shown in FIGS. 1 and 2, in which a developing sleeve 2 incorporated therein with a magnet roller 3 is provided in a position confronting the photosensitive surface of a photoreceptor drum 1 driven for rotation in the direction indicated by an arrow (a), and while the developing material supplied to a developing material supply portion F by a bucket roller 4 is being held on the outer peripheral surface of the developing sleeve 2 by the magnetic force of the magnet roller 3, said developing material is transported along the outer peripheral surface of the developing sleeve 2 in the direction indicated by an arrow (c) based on the rotation of the magnet roller 3 in the direction of an arrow (b) and the rotation of the developing sleeve 2 in the direction of the arrow (c), thereby to develop an electrostatic latent image formed on the photosensitive surface of the photoreceptor drum 1 at a developing region V where the surfaces of the developing sleeve 2 and the photoreceptor drum 1 are located close to each other. The arrangement of FIGS. 1 and 2 further includes a magnetic brush bristle height restricting plate 5 disposed above and close to the surface of the developing sleeve 2, a scraper 6 disposed below the developing sleeve 2 in contact with the surface thereof, and a power supply 7 for applying a developing bias to the sleeve 2, with said developing sleeve 2 also functioning as a developing electrode.

With respect to the type in which the magnet roller 3 is driven for rotation in the direction from the developing region V toward the developing material supply portion F as described above, the type in which the developing sleeve 2 is driven for rotation in the opposite direction, i.e. in the developing material transport direction on the whole, is referred to as an FF system, while the type in which the developing sleeve 2 is rotated in the same direction as that of the magnet roller 3 is called an FR system hereinafter. One example of the developing method by the FR system is disclosed, for example, in U.S. Pat. No. 4,267,248.

Incidentally, in the conventional developing processes (not limited to the FF system, but including the FR system or a system in which only either one of the developing sleeve or the magnet roller is driven for rotation), after passing through a position X1 (interval or distance d1) where the surfaces of the developing sleeve 2 and the photoreceptor drum 1 are the closest to each other, the developing material completes the contact with respect to the surface of the photoreceptor drum 1 at a position X1' (interval or distance d1') where the developing sleeve 2 is leaving the surface of the photoreceptor drum 1. In the known arrangement as described above, however, there are such problems as fogging of toner respect to developed images, leakage of toner out of the developing apparatus, and in the case of a developing material employing carrier, such inconveniences as of toner images, faulty reproduction of fine lines, or adhesion of carrier with a small magnetic restriction onto the photoreceptor drum, etc., resulting from scraping off of the toner images by the carrier.

It has been confirmed that the problems as described above are attributable to the fact that the distance d1' is larger than the distance d1, and that in the developing material employing carrier, fogging and leakage of toner tend to occur in the presence of toner with a small electrical charge amount within the developing material. Furthermore, in the developing material adopting the carrier, it is unavoidable that the toner with a small charge amount is present in the developing material at a constant ratio, even if small in the quantity.

The toner with a small electrical charge amount as referred to above is liable to leave the carrier for floating, and thus, when the developing material is about to leave the surface of the photoreceptor drum 1, the toner with the small amount of electrical charge is to float in the space at the position X1' described earlier.

As is clear from the conditions $d1' > d1$ stated previously, the electric field between the surfaces of the developing sleeve 2 and the photoreceptor drum 1 at the downstream side in the transport direction beyond the position X1' and the position in the vicinity thereof is not very strong, being weaker than that in the vicinity of the closest position X1. Accordingly, the floating toner can not fully receive the electric force from the electrostatic latent image formed on the surface of the photoreceptor drum 1, and consequently, adheres to the background portion of the image to form the undesirable fogging, or leaks out downwardly without being attracted onto the developing sleeve 2 or photoreceptor drum 1.

Meanwhile, the fact that the electric field by the electrostatic latent image at the position X1' is weaker than that at the closest position X1, means that the attraction toward the photoreceptor drum side with respect to the toner adhering to the surface of the photoreceptor drum 1 at the closest position X1 becomes weaker at the position X1' than in said closest position X1. Accordingly, there occurs such a phenomenon that the toner adhering to the image portion at the closest position X1 is scraped off by the brush bristles of the developing material (carrier) at the position X1', and such a phenomenon leads to blurring of toner images or faulty reproduction of fine lines in the toner images.

In addition, if the carrier particles have small diameters and are of binder type, they are small in the magnetic force and capable of possessing a considerably high charge amount opposite in polarity to the toner, and thus, such carrier particles tend to adhere to the image background portion. Such phenomenon is liable to take place as the interval or distance d1' becomes larger due to reduction of the magnetic attracting force by the magnet roller 3.

SUMMARY OF THE INVENTION

Accordingly, an essential object of the present invention is to provide an improved developing apparatus for use in an image forming system, which is free from such problems as fogging of toner with respect to developed images, leakage of toner out of the developing apparatus, etc. and blurring of toner images, faulty reproduction of fine lines, and adhesion of carrier with a small magnetic force onto the photoreceptor drum in the case of a developing material employing carrier.

In accomplishing these and other objects, according to one preferred embodiment of the present invention, there is provided a developing apparatus which includes a developing sleeve rotatably provided to confront an object to be developed, a magnet roller incorporated within the developing sleeve so as to be driven for rotation in the same direction as the developing sleeve, and a supply means for supplying the developing material onto the peripheral surface of the developing sleeve. The developing apparatus is so arranged as to satisfy such conditions as $$D \cdot \pi \cdot Wsl \cdot dl > p \cdot Wmg$$

where
- D: developing sleeve diameter (mm)
- Wsl: developing sleeve revolutions (rpm)
- dl: the closest distance between the sleeve surface and the object to be developed
- p: number of poles of the magnet roller
- Wmg: revolutions of the magnet roller (rpm).

More specifically, in one aspect of the present invention, the developing apparatus which includes a developing sleeve rotatably provided to confront an object to be developed, a magnet roller incorporated with the developing sleeve so as to be driven for rotation in a direction opposite to that of the developing sleeve, a supply means for supplying developing material onto the peripheral surface of the developing sleeve, a developing material guide member extending generally along the peripheral surface of the developing sleeve, from a developing material supply portion toward a position where the developing sleeve is approaching the object to be developed, and a developing material amount restricting member for restricting the amount of the developing material transported over the surface of the developing material guide member. The developing material amount restricting member is disposed to confront the developing sleeve through an interval larger than an interval between the forward edge of the developing material guide member and the object to be developed.

By the arrangement of the present invention as described above, favorable copied images free from fogging of toner, etc. could be obtained, with leakage of toner from between the casing and the object to be developed being scarcely noticed.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
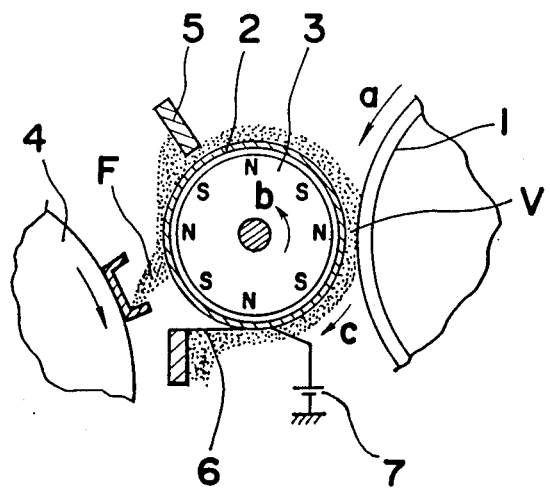
FIG. 1 is a schematic side sectional view of a conventional electrostatic latent image developing apparatus (already referred to)
Figure 2:
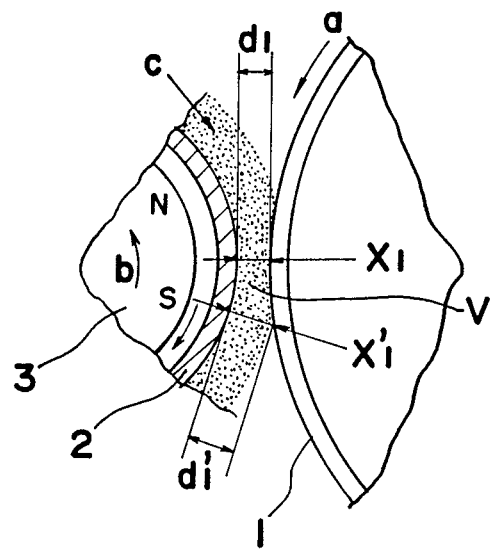
FIG. 2 is a fragmentary side sectional view showing on an enlarged scale, an essential portion of the developing apparatus of FIG. 1 (already referred to)

Before the description of the present invention proceeds, it is to be noted that like parts are designated by like reference numerals throughout the accompanying drawings.

In the first place, an electrostatic latent image developing process related to the present invention will be described with reference to the case where it is effected through the FR system referred to earlier, in which the developing sleeve is driven for rotation in the same direction as that of the magnet roller.

In the FR system, as observed on the whole, the developing material is transported over the outer peripheral surface of the developing sleeve in a direction opposite to the rotating direction of the magnet roller. More specifically, the upper portion of the magnetic brush is transported by the movement of the magnetic field based on the rotation of the magnet roller, while being moved in itself in a direction opposite to the rotating direction of the magnet roller, and the lower portion of the magnetic brush close to the outer peripheral surface of the developing sleeve is transported, based on the rotation of the developing sleeve, in the rotating direction of said developing sleeve, i.e., in a direction opposite to the developing material transporting direction on the whole. It is to be noted, however, that the transporting speed for such lower portion is generally lower than that at the upper portion of the magnetic brush.

In the electrostatic latent image developing process according to the present invention, contact of the developing material with respect to the photoreceptor drum (such contact region is referred to as a developing region) is terminated at a position where a developing electrode (e.g., a developing sleeve which functions also as the developing electrode) is approaching or the closest to an electrostatic latent image support member (e.g., a drum having a photosensitive layer on the surface). In the FR system, the developing process as described above may be so arranged that the developing material is not present on the outer peripheral surface of the developing sleeve at the downstream side of the developing region, by increasing the developing material transport speed Vsl based on the developing sleeve being larger than the developing material transport speed Vmg based on the magnet roller at the developing region.

More specifically, the transport speed [Vmg (mm/sec)] based on the rotation of the magnet roller may be represented by the equation $$Vmg = h \cdot p \cdot (Wmg/60) \qquad (1)$$

where
h: magnetic brush bristle height (mm)
p: number of magnetic poles
Wmg: revolutions of the magnet roller (rpm).

Meanwhile, the transport speed [Vsl (mm/sec)] based on the rotation of the developing sleeve is represented by an equation $$Vsl = D \cdot \pi \cdot (Wsl/60) \qquad (2)$$

where
D: diameter of the developing sleeve (mm)
Wsl: revolutions of the developing sleeve (rpm).

Accordingly, the developing material transport speed [Vdev (mm/sec)] as a whole is represented by $$Vdev = Vmg - Vsl = (h \cdot p \cdot Wmg - D \cdot \pi \cdot Wsl)/60 \qquad (3)$$

Incidentally, at the closest position between surfaces of the developing sleeve and the photoreceptor drum, the bristle height h necessarily becomes the distance d1. Accordingly, for avoiding presence of the developing material on the outer peripheral surface of the developing sleeve at the downstream side beyond the developing region, it may be so arranged to satisfy the following relation.

$$D \cdot \pi \cdot Wsl > d1 \cdot p \cdot Wmg \qquad (4)$$

In other words, the diameter of the developing sleeve, number of poles of the magnet roller, number of revolutions thereof, distance between the developing sleeve and the photoreceptor drum, etc. may be set so as to satisfy the above relation.

Figure 3:
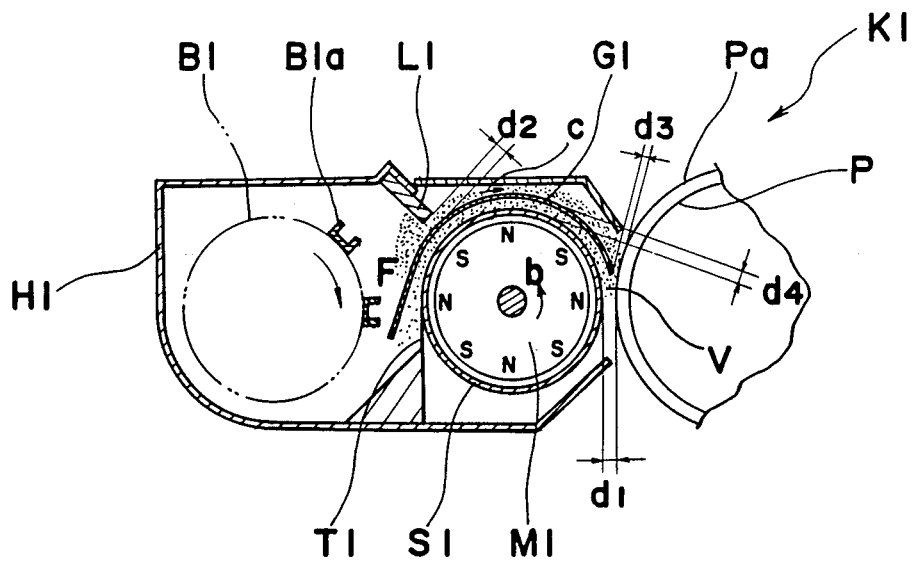
FIG. 3 is a schematic side sectional view showing an electrostatic latent image developing apparatus according to one preferred embodiment of the present invention.
Figure 4:
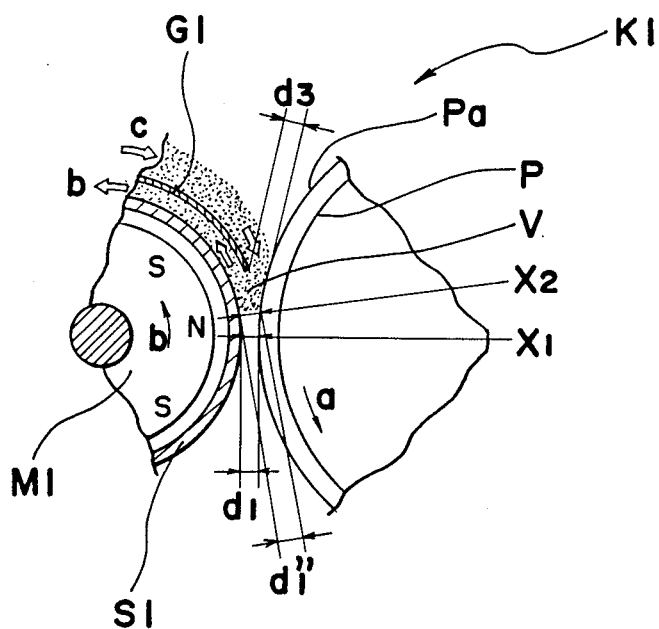
FIG. 4 is a fragmentary side sectional view shown on an enlarged scale, an essential portion of the developing apparatus of FIG. 3.

Referring to FIGS. 3 and 4, there is shown an electrostatic latent image developing apparatus K1 of the FR system according to one preferred embodiment of the present invention, which generally includes a developing material casing H1 open at its one end adjacent to the photosensitive surface Pa of a photoreceptor drum P, a developing sleeve S1 rotatably supported in the casing H1 adjacent to its opening so as to be driven for rotation in a direction indicated by the arrow (b), a magnet roller M1 sequentially magnetized by N and S poles around its peripheral surface and rotatably incorporated within the developing sleeve S1 for rotation also in the direction of the arrow (b), and a bucket roller B1 having a plurality of buckets B1a mounted on its peripheral surface and rotatably provided adjacent to the developing sleeves S1 within the casing H1 for supplying the developing material to a supply portion F.

The developing apparatus K1 further includes a developing material transport guide member G1 provided above and adjacent to approximately the upper half of the peripheral surface of the developing sleeve S1. This guide member G1 has an arcuate cross section concentric with the developing sleeve S1 and disposed to extend from the developing material supply portion F to the developing region V in a spaced relation from the outer peripheral surface of the developing sleeve S1 generally by a constant interval d4. In the present embodiment, although the guide member G1 is made of an insulative material, it may be modified to be formed by an electrically conductive material, if supported to achieve electrical insulation. There are also provided a magnetic brush bristle height restricting plate L1 supported by the casing H1 above and adjacent to the guide member G1 through an interval d2 at its forward edge from the upper surface of said guide member G1, and a scraper T1 disposed below the developing sleeve S1 so as to lightly contact under pressure, at its forward edge, the peripheral surface of said developing sleeve S1.

Subsequently, specific numerical values for the developing apparatus K1 and developing process according to the present invention will be described based on the experiments carried out by the present inventors.

DEVELOPING SLEEVE

Diameter: 31 mm
Revolutions: 70 rpm
Developing bias: +150 V (DC).

MAGNET ROLLER

Number of poles: 8
Magnetic force: 1000 G (on the surface of the developing sleeve)
Revolutions: 1300 rpm
Interval d1 at closest position between the developing sleeve and photoreceptor drum: 0.5 mm
Interval d2 for bristle height restriction between the bristle height restricting plate and developing material guide member: 1.5 mm
Interval d3 between the developing material transport guide member and photoreceptor drum: 1.0 mm
Interval d4 between the developing material transport guide member and developing sleeve: 1.2 mm.

PHOTORECEPTOR DRUM

Circumferential speed: 130 mm/sec
Electrostatic latent image highest potential: −500 V.

DEVELOPING MATERIAL

A mixture of 90% by weight of binder type insulative magnetic carrier having an average particle diameter of 38 μm and 10% by weight of insulative non-magnetic toner having an average particle diameter of 11 μm. In the triboelectrical charging, the carrier is charged to the positive polarity, while the toner is charged to the negative polarity.

Under the above conditions, it is needless to say that the relation (4) referred to earlier for avoiding presence of the developing material on the outer peripheral surface of the developing sleeve S1 at the downstream side beyond the closest position X1, is satisfied.

Hereinbelow, movement of the developing material in the developing apparatus K1 of FIGS. 3 and 4 as described so far will be explained.

The developing material contained in the casing H1 is fed by the bucket roller B1 to the supply portion F, and is transported over the developing material transport guide member G1 in the direction of the arrow (c) (FIG. 4) based on the rotation of the magnet roller M1 in the direction of the arrow (b), while being restricted for its magnetic brush bristle height by the bristle height restricting plate L1. The developing material transported over the guide member G1 in the direction of the arrow (c) is brought into contact with the surface Pa of the photoreceptor drum P at the forward end of the guide member G1 so as to develop the electrostatic latent image preliminarily formed on the surface Pa into a visible image. Simultaneously, the developing material contacts the outer peripheral surface of the developing sleeve S1, and through rotation of the developing sleeve S1, is transported between the developing sleeve S1 and the guide member G1 in the direction of the arrow (b) (FIG. 4), and is scraped off the surface of the developing sleeve S1 by the scraper T1 so as to be returned into the casing H1.

In the above case, the position X2 where the developing material completes the contact with respect to the photosensitive surface Pa of the photoreceptor drum P is a position at which the surface of the developing sleeve S1 is approaching the corresponding surface Pa of the photoreceptor drum P, and which is located slightly above the closest position X1 between the surfaces of the developing sleeve S1 and the photoreceptor drum P. As a result, the developing material is not present on the outer peripheral surface of the developing sleeve S1 at the downstream side beyond the closest position X1 with respect to the direction of displacement (as indicated by the arrow (a)) of the photoreceptor drum P.

When copying experiments were carried out by the electrostatic copying apparatus employing the developing process of the present invention as described so far, favorable copied images free from fogging of toner, etc. could be obtained, even through employment of toner with a comparatively low charge amount. Moreover, even when a continuous copying for 10,000 sheets was effected similarly with adoption of a toner having a relatively low charge amount, leakage of toner was hardly noticed from between the casing H1 and the photoreceptor drum P.

The effect as described above is considered to be attributable to the fact that the position X2 where the developing material completes the contact with respect to the photoreceptor drum P is located at the upstream side of the closest position X1, with the interval d1″ thereat being larger than the interval d1 at said closest position X1. More specifically, after completion of the contact with respect to the developing material, the surface of the photoreceptor drum P is to pass the closest position X1 where the electric field between the electrostatic latent image on the photoreceptor drum P and the developing sleeve S1 is the strongest. The floating toner leaving the carrier due to its small charge amount is attracted onto the image portion by the strong electric field when said image portion passes, and onto the developing sleeve S1 as the background portion for the image portion is passing, and respectively adheres to the image portion on the surface Pa of the photoreceptor drum P or to the outer peripheral surface of the developing sleeve S1. Accordingly, there is no such inconvenience that the floating toner adheres to the background portion to form the undesirable fogging or leaks out of the developing apparatus.

Meanwhile, in the developing region V, since the electric field between the developing sleeve S1 and the photoreceptor drum P is the strongest at the position X2 where the contact of the developing material is completed, there is no possibility that the carrier scrapes off, at the position X2, the toner having adhered to the image portion prior to the arrival at the position X2, and thus, blurring of the toner images, faulty reproduction of fine lines, etc. do not take place.

Moreover, even when the carrier has a small magnetic restricting force since it is of the binder type with a small diameter as in the present embodiment, adhesion of the carrier does not readily take place owing to the fact that the magnetic field at the termination of contact of the developing material is the maximum.

In the above arrangement of FIGS. 3 and 4, the purpose for providing the developing material transport guide member G1 is to eliminate the lowering of toner concentration in the developing material at the developing region V in the case of the developing material employing the carrier. More specifically, by the provision of the developing material transport guide member G1 as described above, the developing material before the development transported in the direction of the arrow (c) based on the rotation of the magnet roller M1 is separated from the developing material lowered in the toner concentration after the development, and transported in the direction of the arrow (b) based on the rotation of the developing sleeve S1 by said guide member G1, without any replacement or exchange of the developing material between both of the transport passages.

Incidentally, the interval d4 between the guide member G1 and the developing sleeve S1 is considerably larger than the developing gap d1, and according to the FR system, the developing material transported in the direction of the arrow (b) over the outer peripheral surface of the developing sleeve S1 has the magnetic brush bristle height for the interval d4, and the upper portion thereof is subjected to the transport force in the direction of the arrow (c) as represented by equation (1) referred to earlier based on the rotation of the magnet roller M1.

However, in the result of the experiments carried out by the present inventors, the developing material between the developing sleeve S1 and the guide member G1 was actually being transported in the direction of the arrow (b) through rotation of the developing sleeve S1, which may be attributable to the reason as follows.

That is to say, the transport force following self-turning of the developing material through rotation of the magnet roller M1 varies depending on the amount of the developing material therebetween, and since the smooth movement of the developing material is obstructed as the amount becomes high, the transport force following self-turning of the developing material becomes weak. It is considered that the amount of the developing material is comparatively high between the developing sleeve S1 and the guide member G1, and therefore, the developing material moves in the direction of the arrow (b) as a whole.

Figure 5:
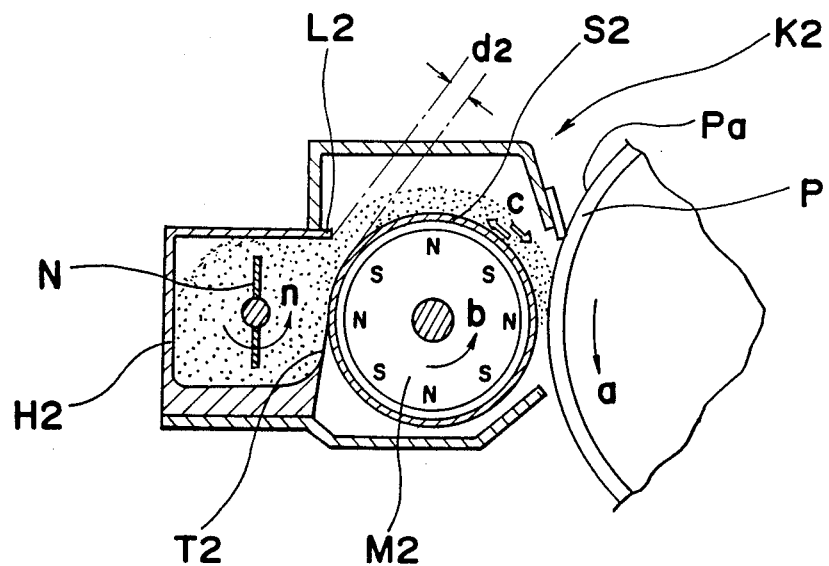
FIG. 5 is a schematic side sectional view showing an electrostatic latent image developing apparatus according to a second embodiment of the present invention.
Figure 6:
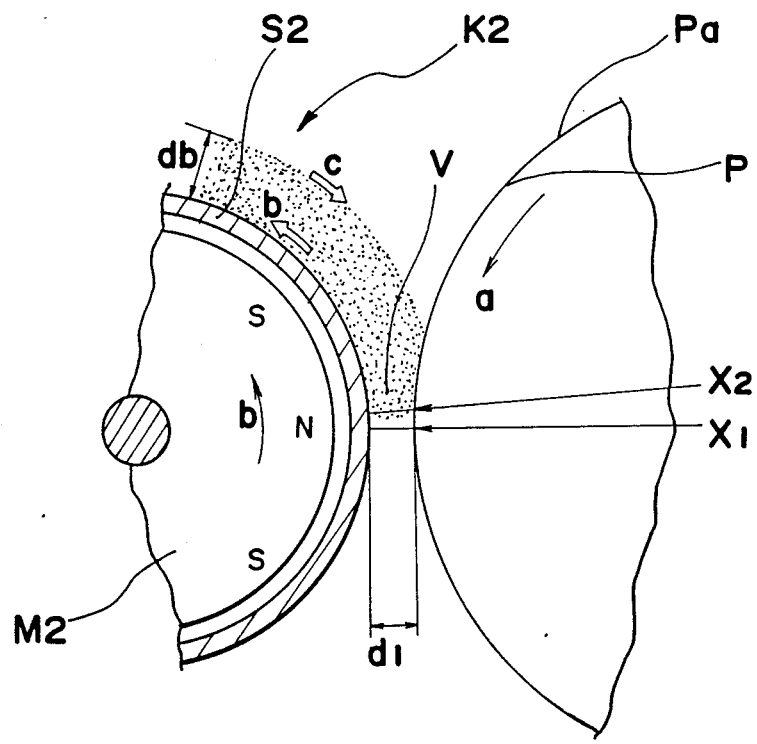
FIG. 6 is a fragmentary side sectional view showing on an enlarged scale, an essential portion of the developing apparatus of FIG. 5.

Referring to FIGS. 5 and 6, there is shown an electrostatic latent image developing apparatus K2 according to a second embodiment of the present invention, which employs a mono-component developing material.

The developing apparatus K2 includes a developing material casing H2 open at its one end close to the surface Pa of the photoreceptor drum P, an electrically conductive developing sleeve S2 rotatably supported within the casing H2 so as to confront the photosensitive surface Pa of the photoreceptor drum P through a predetermined interval, a magnet roller M2 successively magnetized by N and S poles and rotatably accommodated within the developing sleeve S2, a developing material supply vane N rotatably disposed in the casing H2 for rotation in the direction of the arrow n, a scraper T2 extending upwardly from the bottom portion of the casing H2 and contacting at its upper edge, the peripheral surface of the developing sleeve S2, and a projection L2 also extending laterally from the rear upper portion of the casing toward the surface of the developing sleeve S2 for functioning as a bristle height restricting plate for the developing material.

The developing sleeve S2 is driven for rotation in the direction of the arrow (b) at a comparatively low speed, and the magnet roller M2 is also driven for rotation in the same direction (i.e., direction as indicated by the arrow (b)) at a comparatively high speed, while the photoreceptor drum P is driven in the direction of the arrow (a) as described earlier with reference to FIGS. 3 and 4, whereby the elctrostatic latent image formed on the surface Pa thereof is developed by the developing apparatus K2.

Hereinbelow, specific numerical values for the developing apparatus K2 according to the above embodiment will be described based on the experiments carried out by the present inventors.

DEVELOPING SLEEVE

Diameter: 31 mm
Revolutions: 60 rpm.

MAGNET ROLLER

Number of poles: 8
Magnetic force: 750 G (on the surface of the developing sleeve)
Revolutions: 1200 rpm
Interval d1 at closest position between the developing sleeve and phot receptor drum: 0.4 mm
Interval d2 for bristle height restriction between the bristle height restricting plate and the developing sleeve: 1.5 mm.

DEVELOPING MATERIAL

Mono-component developing material composed of a magnetic toner.

It is needless to say that the specific values as described above satisfy the relation (4) given earlier.

Subsequently, movement of the developing material in the above developing apparatus K2 of FIGS. 5 and 6 will be described.

The developing material is supplied onto the outer peripheral surface of the developing sleeve S2 based on the rotation of the supply vane N in the direction of the arrow (n).

In the case where the developing sleeve S2 and the magnet roller M2 are driven in the same direction as in the present embodiment, the developing material is transported, as viewed on the whole, over the peripheral surface of the developing sleeve S2 in the direction (in the direction of the arrow (c)) opposite to the rotating direction of the magnet roller M2, while being restricted for this bristle height by the bristle height restricting portion L2. In this case, the bristle height db of the developing material is equal to the interval d2 between the forward edge of the bristle height restricting portion L2 and the surface of the developing sleeve S2.

Upon investigation into the state of transportation as described above in detail, it is seen that in the system as in the present invention in which the developing sleeve and the magnet roller are driven for rotation in the same direction, the upper portion of the magnetic brush is transported in the direction opposite to the rotating direction of the magnet roller M2 through movement of the magnetic field based on the rotation of said magnet roller M2.

On the other hand, the lower portion of the magnetic brush close to the peripheral surface of the developing sleeve S2 is transported in the rotating direction of the developing sleeve S2 following the rotation thereof, i.e., in the direction opposite to the transport direction on the whole. However, the transport speed thereof is lower than the transport speed at the upper portion of the magnetic brush.

In the above case also, the position X2 where the developing material completes the contact with respect to the photosensitive surface Pa of the photoreceptor drum P is a position at which the surface of the developing sleeve S1 is approaching the corresponding surface Pa of the photoreceptor drum P, and which is located slightly closer to the upstream side than the closest position X1 between the surfaces of the developing sleeve S1 and the photoreceptor drum P. As a result, the developing material is not present on the outer peripheral surface of the developing sleeve S1 at the downstream side beyond the closest position X1 with respect to the direction of displacement (as indicated by the arrow (a)) of the photoreceptor drum P.

When copying experiments were carried out by the copying apparatus K2 of the present invention as described so far, the undesirable blurring of toner images, faulty reproduction of fine lines, etc. did not take place. Moreover, fogging of toner was not present, with leakage of toner from the developing apparatus being hardly noticeable.

The effect as described above is considered to be attributable to the fact that the position X2 where the developing material completes the contact with respect to the photoreceptor drum P is located at the upstream side of the closest position X1. In other words, the developing region V, since the electric field between the developing sleeve S2 and the photoreceptor drum P is the strongest at the position X2 where the contact of the developing material is completed, there is no possibility that the carrier scrapes off, at the position X2, the toner having adhered to the image portion prior to the arrival at the position X2, and thus, blurring of the toner images, faulty reproduction of fine lines, etc. do not take place.

Furthermore, the magnetic attracting force of the magnet roller M2 with respect to the brush bristle top portion of the developing material is the strongest at the position X2. Accordingly, adhesion of the magnetic toner to the non-image portion of the photoreceptor drum P becomes the most difficult to take place thereat, and thus, generation of fogging of toner is eliminated, with leakage of the magnetic toner being also prevented.

Figure 7:
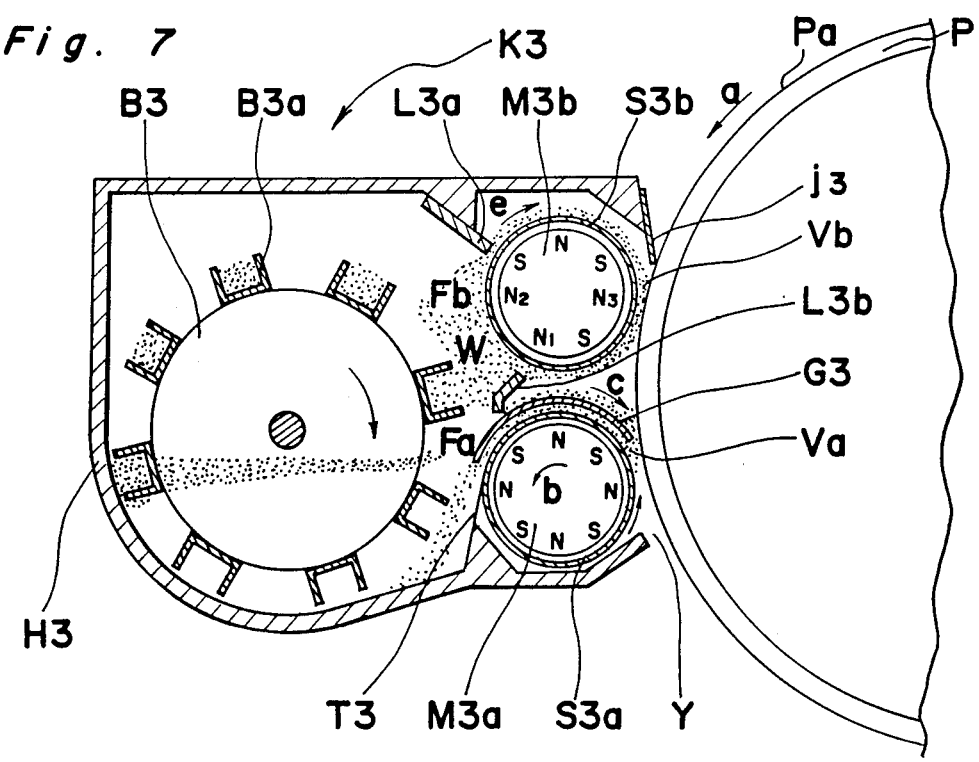
FIG. 7 is a schematic side sectional view showing an electrostatic latent image developing apparatus according to a third embodiment of the present invention.
Figure 8:
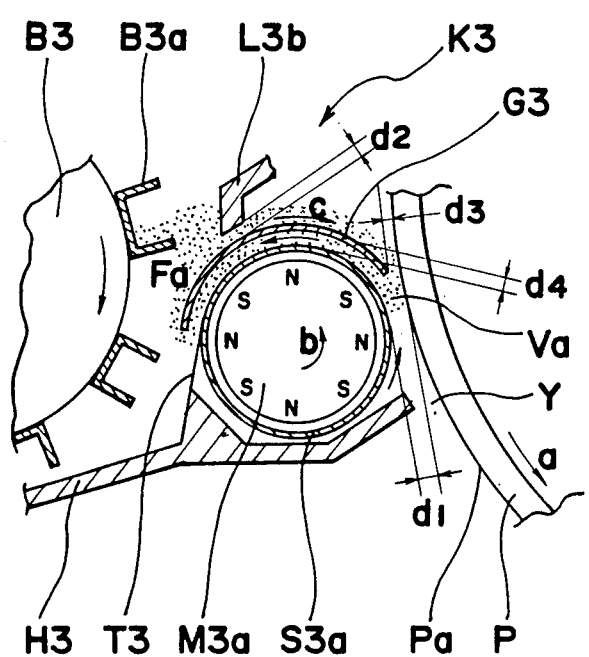
FIGS. 8 and 9 are fragmentary side sectional views showing on an enlarged scale, essential portions of the developing apparatus of FIG. 7.
Figure 9:
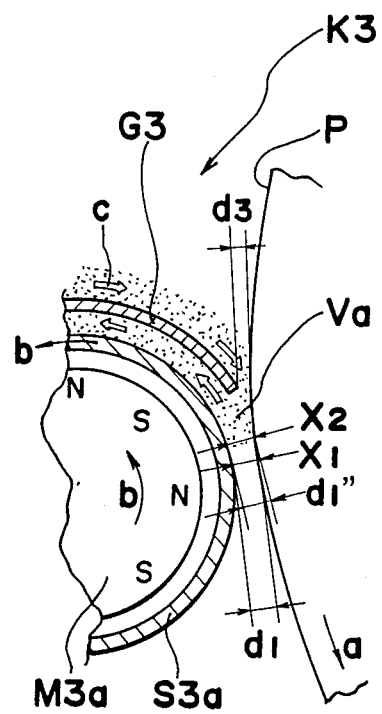

Referring further to FIGS. 7 through 9, there is shown an electrostatic latent image developing apparatus K3 according to a third embodiment of the present invention.

The developing apparatus K3 generally includes a developing material casing H3 open at its one end adjacent to the photosensitive surface Pa of the photoreceptor drum P, a lower developing sleeve S3a and an upper developing sleeve S3b rotatably provided within the casing 3H in positions confronting the photoreceptor drum P, a lower magnet roller M3a and an upper magnet roller M3b respectively accommodated within the developing sleeves S3a and S3b, and a developing material supply bucket roller B3 with buckets B3a mounted at equal intervals on its peripheral surface and disposed behind the developing sleeves S3a and S3b so as to be driven for rotation in the clockwise direction. The upper developing sleeve S3b is driven for rotation in the direction of the arrow (e), with the magnet roller M3b thereof fixed, while at the downstream side in the direction of the arrow (e) of the developing supply portion Fb, a bristle height restricting plate L3a is provided on the casing H3 to confront the developing sleeve S3b.

Meanwhile, since the developing sleeve S3a, magnet roller M3a, developing material transport guide member G3 and scraper T3, etc. are generally similar in the functions and constructions thereof to those in the first embodiment of FIGS. 3 and 4, detailed description thereof is abbreviated here for brevity.

The photoreceptor drum P is driven for rotation in the direction of the arrow (a), and the clearance between the upper edge of the casing H3 and the surface Pa of the photoreceptor drum P is sealed by an insulative sheet j3 attached to said edge of the casing H3 and adapted to contact said surface Pa at its forward edge. For the material of the above insulative sheet j3, for example, a thin sheet of polyurethane or Mylar (name used in trade and manufactured by DuPont) is employed.

Hereinafter, movement of the developing material in the developing apparatus K3 having the construction as described above will be explained.

Around the upper developing sleeve S3b, the developing material supplied to the supply portion Fb by the bucket roller B3 is transported in the direction of the arrow (e) based on the rotation of the developing sleeve S3b in the same direction, while being retained on the peripheral surface of the developing sleeve S3b by the magnetic force of the magnet roller M3b, and reaches the developing region Vb through restriction of its bristle height (transport amount) by a bristle height restricting plate L3a provided on the casing H3 above and adjacent to the developing sleeve S3b so as to develop the electrostatic latent image preliminarily formed on the photosensitive surface Pa of the photoreceptor drum P. Thereafter, the developing material is further transported in the direction of the arrow (e), and then, leaves the peripheral surface of the developing sleeve S3b at a region W by the repelling magnetic field of the same polarity magnetic poles N1 and N2 disposed side by side on the magnet roller M3b so as to be returned into the casing H3.

On the other hand, around the lower developing sleeve S3a, the developing material supplied to the supply portion Fa is transported over the developing material transport guide member G3 in the direction of the arrow (c) based on the rotation of the magnet roller M3a in the direction of the arrow (b), while being restricted for its bristle height (transport amount) by a bristle height restricting plate L3b. The developing material transported in the direction of the arrow (c) over the guide member G3 contacts the surface Pa of the photoreceptor drum P almost simultaneously as it is transferred from the forward edge of the guide member G3 onto the peripheral surface of the developing sleeve S3a, thereby to again develop the electrostatic latent image formed on said surface Pa. Thereafter, as the developing sleeve S3a rotates, the developing material is transported between the developing sleeve S3a and the guide member G3 in the direction of the arrow (b), and scraped off the surface of the developing sleeve S3a by the scraper T3 so as to be returned into the casing H3.

Subsequently, specific numerical values for the developing apparatus K3 and developing conditions will be described based on the experiments carried out by the present inventors.

UPPER DEVELOPING SLEEVE S3b

Diameter: 31 mm
Revolutions: 150 rpm
Developing bias: +200 V (DC).

UPPER MAGNET ROLLER M3b

Number of poles: 7
Magnetic force: 1000 G (on the developing sleeve surface at the main magnetic pole N3)
Developing interval: 0.7 mm
Bristle height restricting interval: 0.5 mm.

LOWER DEVELOPING SLEEVE S3a

Diameter: 31 mm
Revolutions: 70 rpm
Developing bias: +200 V (DC) 350 Vrms, 1 KHz (AC).

LOWER MAGNET ROLLER M3a

Number of poles: 8
Magnetic force: 1000 G (on the developing sleeve surface)
Revolutions: 1300 rpm
Interval d1 at closest position: 0.5 mm
Interval d2 for bristle height restriction: 1.5 mm
Interval d3 between the developing material transport guide member and photoreceptor drum: 1.0 mm
Interval d4 between the developing material transport guide member and developing sleeve: 1.2 mm.

PHOTORECEPTOR DRUM

Circumferential speed: 260 mm/sec
Electrostatic latent image highest potential: +700 V.

DEVELOPING MATERIAL

A mixture of 92% by weight of binder type insulative magnetic carrier having an average particle diameter of 55 $\mu$m and 8% by weight of insulative non-magnetic toner having an average particle diameter of 11 $\mu$m. In the triboelectrical charging, the carrier is charged to the positive polarity, while the toner is charged to the negative polarity.

Under the above conditions, relation (4) referred to earlier for avoiding presence of the developing material on the outer peripheral surface of the developing sleeve S3a at the downstream side beyond the closest position X1, is of course satisfied.

When copying experiments were carried out by an electrophotographic copying apparatus employing the developing apparatus K3 and the developing conditions as described so far, sufficient image density was obtained, and undesirable scattering or spilling of toner and carrier out of the developing apparatus was hardly noticeable even when a continuous copying for 50,000 sheets was effected.

The effect as above is considered to be achieved by the reasons as follows.

Specifically, the reason why the sufficient image density could be obtained in spite of the fact that the circumferential speed of the photoreceptor drum P is high at 260 mm/sec is such that, by the provision of the two developing sleeves for the upper and lower stages, a sufficient amount of toner could be supplied to the electrostatic latent image. Owing to the sealing characteristic by the insulative sheet j3 provided at the upper edge of the casing H3 to contact the photosensitive surface Pa of the photoreceptor drum P, scattering or spilling of the toner and carrier out of the upper portion of the developing apparatus was scarcely observed.

Meanwhile, the effect that there was almost no spilling of toner through a gap Y (FIG. 7) between the casing H3 and the surface Pa of the photoreceptor drum P may be attributable to the fact that no developing material is present on the outer peripheral surface of the lower developing sleeve S3a in the direction toward the exterior of the developing apparatus beyond the closest position X1 between the lower developing sleeve S3a and the photoreceptor drum P, i.e., to the fact that the position X2 where the developing material completes the contact with respect to the photoreceptor drum P is located at the upstream side of the closest position X1, with the interval d1'' thereat being larger than the interval d1 at said closest position X1. More specifically, after completion of the contact with respect to the developing material, the surface Pa of the photoreceptor drum P is to pass the closest position X1 where the electric field between the electrostatic latent image on the photoreceptor drum P and the developing sleeve S3a is the strongest. The floating toner leaving the carrier due to its small charge amount is attracted onto the image portion by the strong electric field when said image portion passes, and onto the developing sleeve S3a as the background portion for the image portion is passing, and respectively adheres to the image portion on the surface Pa of the photoreceptor drum P or to the outer peripheral surface of the developing sleeve S3a. Accordingly, there is no such inconvenience that the floating toner leaks out of the developing apparatus. Simultaneously, such inconvenience that the fogging is formed by the adhesion of the floating toner on the background portion of the image may also be prevented. In other words, the developing sleeve S3a also has functions as a toner spilling preventing roller and/or toner dust generation preventing roller, and makes it possible to achieve compact size for the developing apparatus and consequently copying machine.

Furthermore, in the developing apparatus K3 of the present embodiment, at the developing region Va, since the electric field between the developing sleeve S3a and the photoreceptor drum P is the strongest at the position X2 where the contact of the developing material is completed, there is no possibility that the carrier scrapes off, at the position X2, the toner having adhered to the image portion prior to the arrival at the position X2, and thus, blurring of the toner images, faulty reproduction of fine lines, etc. do not take place. Moreover, even when the carrier has a small magnetic restricting force since it is of the binder type with a small diameter as in the present embodiment, adhesion of the carrier does not readily take place owing to the fact that the magnetic field at the termination of contact of the developing material is the maximum.

Figure 10:
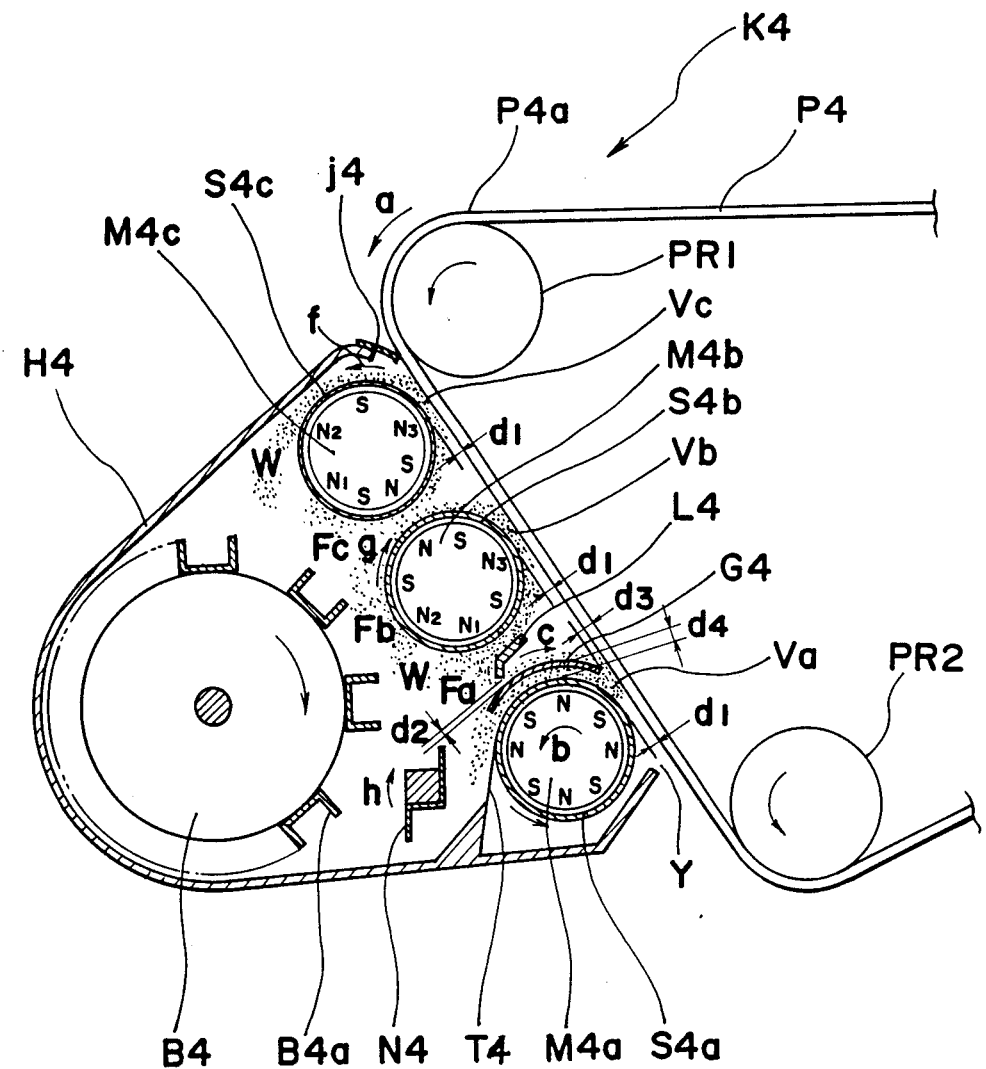
FIG. 10 is a schematic side sectional view showing an electrostatic latent image developing apparatus according to a fourth embodiment of the present invention.

Reference is further made to FIG. 10 showing an electrostatic latent image developing apparatus K4 according to a fourth embodiment of the present invention.

The developing apparatus K4 includes a developing material casing H4 of a generally U-shaped cross section open at one end confronting a photosensitive surface P4a of a photoreceptor endless belt P4 movably supported by supporting rollers PR1 and PR2, developing sleeves S4a, S4b and S4c aligned in three stages adjacent to the photosensitive surface P4a through the open end of the casing H4, magnet rollers M4a, M4b and M4c respectively accommodated within the corresponding developing sleeves S4a, S4b and S4c, and a bucket roller B4 having buckets B4a and rotatably provided within the housing H4 in a position behind the developing sleeves S4a, S4b and S4c.

The upper developing sleeve S4c and the intermediate developing sleeve S4b are respectively driven for rotation in the directions of arrows (f) and (g), while the magnet rollers M4c and M4b respectively accommodated therein are fixed, and no bristle height restricting plate is particularly provided. On the other hand, the lower developing sleeve S4a and a magnet roller M4a accommodated therein have construction generally similar to those in the previous embodiment and are driven for rotation in the same direction, although slightly different therefrom in the specific numerical values. There are also provided a developing material transport guide member G4, a bristle height restricting plate L4 and a scraper T4 also generally similar in constructions to those in the previous embodiments.

In order to eliminate presence of dead spaces within the casing H4, a developing material transport vane N4 is rotatably provided between the lower developing sleeve S4a and the bucket roller B4 so as to be rotatable in the direction of an arrow (h), while an insulative sheet j4 similar to the insulative sheet j3 in the third embodiment of FIG. 7 is provided at the opening edge of the casing H4 to contact the photosensitive surface P4a of the photoreceptor belt P4 to close the gap therebetween for sealing.

Through clockwise rotation of the bucket roller B4, the developing material is fed by the buckets B4a of the bucket roller B4 to supply portions Fc, Fb and Fa for the respective developing sleeves S4c, S4b and S4a, and in the developing sleeves S4c and S4b, is transported over the outer peripheral surfaces thereof in the directions of the arrows (f) and (g) respectively, based on the rotation of the developing sleeves S4c and S4b in said directions of the arrows (f) and (g), thereby to develop the electrostatic latent image preliminarily formed on the surface P4a of the endless belt P4 at respective developing regions Vc and Vb. Thereafter, the developing material is detached from the outer peripheral surfaces of the developing sleeves S4c and S4b at regions W by the repelling magnetic field of the same polarity magnetic poles N1 and N2 disposed side by side.

Meanwhile, the developing material supplied to the developing material supply portion Fa reaches the developing region Va through similar movement to that around the developing sleeve as described with reference to the first and third embodiments, and after subjecting the electrostatic latent image to re-development, is further transported from between the developing sleeve S4a and the developing material transport guide member G4 in the direction of the arrow (b) so as to be finally scraped off the surface of the developing sleeve S4a by the scraper T4.

Given below are the specific numerical values of the developing apparatus K4 and developing conditions on which the experiments were carried out by the present inventors.

UPPER AND INTERMEDIATE DEVELOPING SLEEVES S4c AND S4b

Diameter: 31 mm
Revolutions: 150 rpm
Developing bias: +200 V (DC).

UPPER AND INTERMEDIATE MAGNET ROLLERS M4c AND M4b

Number of poles: 7
Magnetic force: 1000 G (on the developing sleeve surface at the main magnetic pole N3)
Developing interval: 0.7 mm
Bristle height restricting interval: to be restricted by the interval 2 mm between the developing sleeves S4c and S4b.

LOWER DEVELOPING SLEEVE S4a

Diameter: 31 mm
Revolutions: 70 rpm
Developing bias: +200 V (DC) 350 Vrms, 1 KHz (AC).

LOWER MAGNET ROLLER M4a (For intervals d1 to d4, see FIGS. 8 and 9)

Number of poles: 8
Magnetic force: 1000 G (on the developing sleeve surface)
Interval d1 at closest position: 0.5 mm
Interval d2 for bristle height restriction: 1.5 mm
Interval d3 between the developing material transport guide member and photoreceptor belt: 1.5 mm
Interval d4 between the developing material transport guide member and developing sleeve: 1.2 mm.

PHOTORECEPTOR BELT

Circumferential speed: 300 mm/sec
Electrostatic latent image highest potential: +700 V.

DEVELOPING MATERIAL same developing material as in the third embodiment.

When copying experiments were carried out by an electrophotographic copying apparatus employing the developing apparatus K4 and the developing conditions as described so far, sufficient image density was obtained, and undesirable scattering or spilling of toner and carrier out of the developing apparatus was hardly noticeable.

The effects as described above are achieved by the same reasons as described earlier with reference to the third embodiment of FIGS. 7, 8 and 9.

Figure 11:
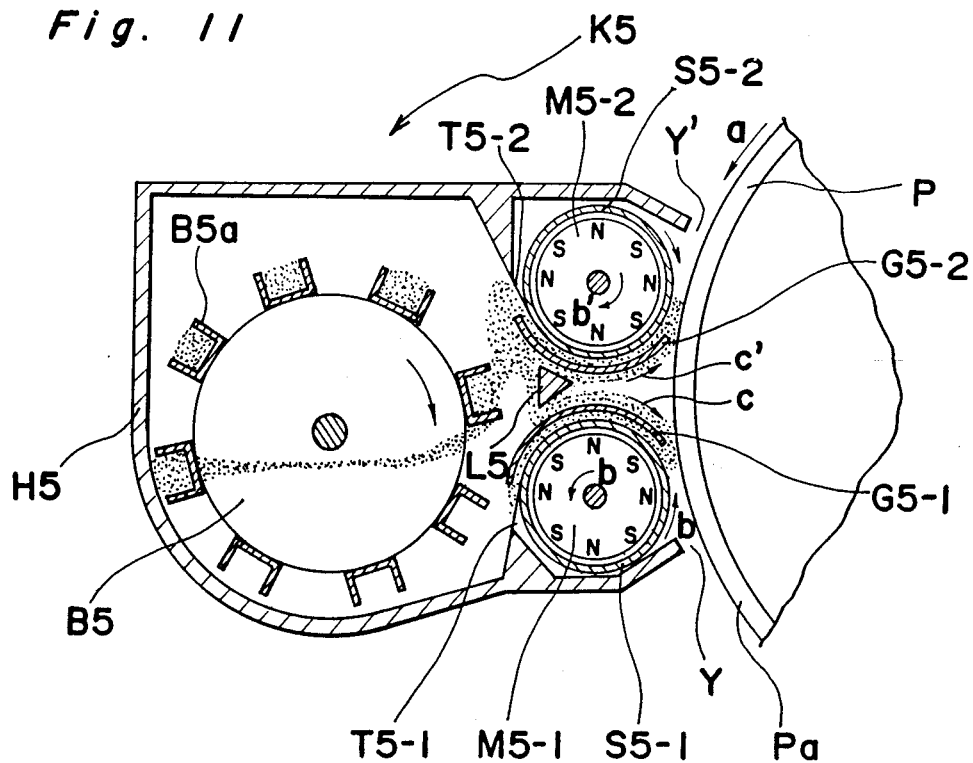
FIG. 11 is a schematic side sectional view showing an electrostatic latent image developing apparatus according to a fifth embodiment of the present invention.
Figure 12:
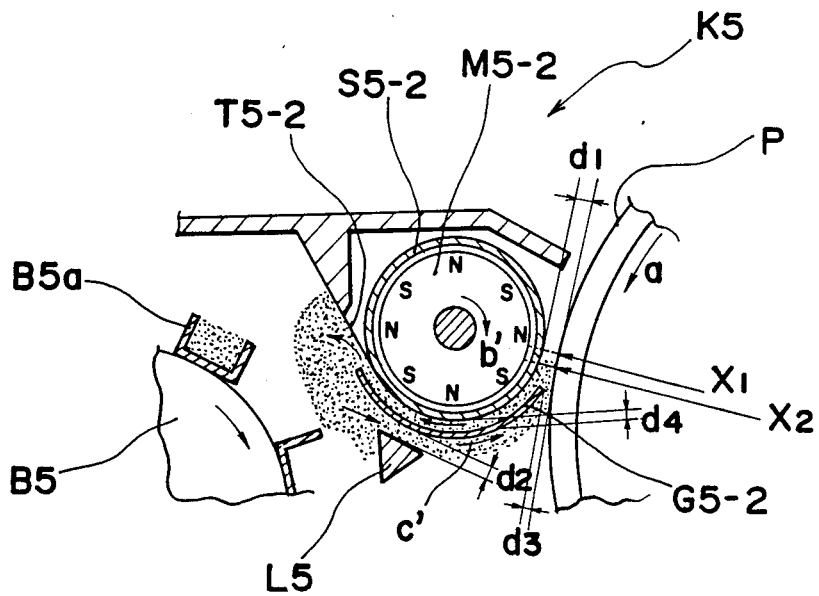
FIG. 12 is a fragmentary side sectional view shown on an enlarged scale, an essential portion of the developing apparatus of FIG. 11.

Referring to FIGS. 11 and 12, there is shown an electrostatic latent image developing apparatus K5 according to a fifth embodiment of the present invention, in which the developing sleeve, magnet roller and developing material transport guide member as described earlier with reference to the developing apparatus K1 for the first embodiment in FIGS. 3 and 4 are provided vertically in two stages in a symmetrical relation as shown.

More specifically, the developing apparatus K5 of FIGS. 11 and 12 includes a developing casing H5 open at one end thereof adjacent to the photosensitive surface Pa of the photoreceptor drum P, a lower developing sleeve S5-1 having a magnet roller M5-1 incorporated therein and a lower guide member G5-1 provided thereover, and a scraper T5-1 extending upwardly from the bottom portion of the casing H5 to contact at its upper edge, the surface of the developing sleeve S5-1, all of which are provided in the casing H5 generally in the similar manner as in the developing apparatus K1 in FIGS. 3 and 4, and an upper developing sleeve S5-2 having a magnet roller M5-2 incorporated therein and an upper guide member G5-2 provided thereunder, and a scraper T5-2 provided to extend downwardly from the upper wall of the casing H5 to contact at its forward edge, the surface of the developing sleeve S5-2 as shown.

The developing apparatus K5 further includes a bristle height restricting member L5 disposed between the developing sleeves S5-1 and S5-2, and the bucket roller B5 having the buckets B5a and rotatably provided within the casing H5 behind said developing sleeves.

With respect to the upper members as shown on an enlarged scale in FIG. 12, the developing sleeve S5-2 is driven for rotation in the direction of the arrow (b'), and the magnet roller M5-2 is also rotated in the direction of the arrow (b'). The developing material is guided in the direction of the arrow (c') along the undersurface of the guide member G5-2, and completes its contact with the surface Pa of the photoreceptor drum P at the position X2 where the developing sleeve S5-2 is approaching said surface Pa, and is transported over the outer peripheral surface of the developing sleeve S5-2 in the direction of the arrow (b').

Regarding the developing sleeve S5-1, magnet roller M5-1, and scraper T5-1, etc. at the lower stage, the direction of rotation and movement of the developing material are generally similar to those in the developing apparatus K1 of FIGS. 3 and 4, and therefore, detailed description is abbreviated here for brevity.

Specific numerical values for the experiments carried out by the present inventors through employment of the above developing apparatus K5 are as follows.

DEVELOPING SLEEVE (common to the developing sleeves S5-1, S5-2)

Diameter: 31 mm
Revolutions: 70 rpm.

DEVELOPING BIAS:

Developing sleeve S5-1: +200 V (DC)
Developing sleeve S5-2: +200 V (DC) 350 Vrms, 1 KHz (AC).

MAGNET ROLLER (common to the magnet rollers M5-1, M5-2)

Number of poles: 8
Magnetic force: 1000 G (on the surface of the developing sleeve)
Revolutions: 1300 rpm
Intervals d1 to d4 (common to the upper and lower stages)
d1: 0.5 mm
d2: 1.5 mm
d3: 1.0 mm
d4: 1.2 mm.

PHOTORECEPTOR DRUM

Circumferential speed: 260 mm/sec
Electrostatic latent image highest potential: +700 V.

DEVELOPING MATERIAL

A mixture of 90% by weight of binder type insulative magnetic carrier having an average particle diameter of 38 μm and 10% by weight of insulative non-magnetic toner having an average particle diameter of 11 μm. In the triboelectrical charging, the carrier is charged to the positive polarity, while the toner is charged to the negative polarity.

Under the above conditions, it is needless to say that the relation (4) referred to earlier for avoiding presence of the developing material on the outer peripheral surface of the developing sleeve S5-1 at the downstream side beyond the closest position X1, is satisfied.

When the copying experiments were carried out by an electrophotographic copying apparatus employing the developing process under the above conditions, the results were generally similar to those of the experiments by the foregoing embodiments in that there was no fogging by toner or adhesion of carrier to the photoreceptor, etc. Moreover, in the above developing apparatus K5, still more sufficient image density could be obtained, and simultaneously, scattering or leakage of toner and carrier were hardly noticed even when a continuous copying of 50,000 sheets was effected without particularly providing sealing plates at the gaps Y and Y' between the casing and the surface of the photoreceptor drum. Thus, according to the present embodiment, since the undesirable scattering of toner toward the upper portion of the developing region of the upper developing sleeve is advantageously prevented, it is not required to provide the insulative sheet j3 or j4 as in the developing apparatus K3 or K4 for the third or fourth embodiment described earlier.

It is to be noted here that the developing bias to be applied to the developing sleeves S5-1 and S5-2 may be of the same voltage or of different voltages, and that AC or DC superposed with AC may be impressed. Needless to say, revolutions of the developing sleeves S5-1 and S5-2, and magnet rollers M5-1 and M5-2 for the upper and lower stages may be differentiated.

Meanwhile, in the respective embodiments as described with reference to FIGS. 3 through 12, the position where the developing material completes the contact with respect to the surface of the photoreceptor is not necessarily the position X2 at which the developing sleeve is approaching the surface of the photoreceptor, but may be at the closest position X1, and even in this case, the effects as described earlier may be achieved.

Furthermore, in any of the foregoing embodiments, although the interval d3 between the forward edge of the developing material transport guide member and the surface of the photoreceptor is set to be narrower than the bristle height restricting interval d2, the relation may be modified to be d3≧d2. In short, the conditions may be such that the developing material completes the contact with respect to the surface of the photoreceptor drum at least at the closest position X1.

It should be noted here that, although all of the first to fifth embodiments as described so far relate to the electrophotographic copying process for developing the electrostatic latent image formed on the photoreceptor, the concept of the present invention is not limited in its application to such electrophotographic copying process alone, but may be applied to an image recording apparatus which is so arranged that while a recording medium is being passed through a recording region at which a recording electrode and a developing electrode confront each other, an image signal voltage is applied to the back of the recording medium from the recording electrode, whereby a toner image corresponding to the image signal is formed on the recording surface of the recording medium by the developing material supplied to the developing electrode.

Figure 13:
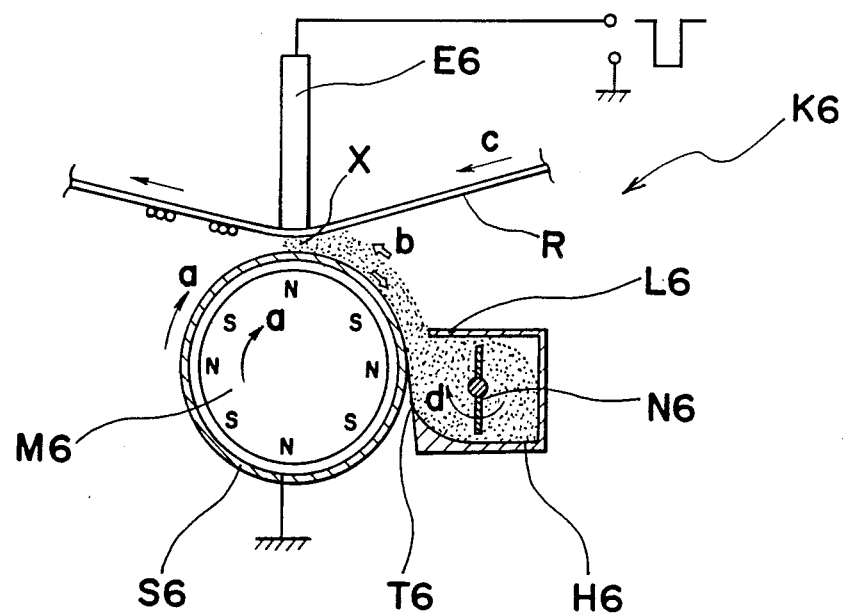
FIG. 13 is a schematic side sectional view showing a developing apparatus according to a sixth embodiment of the present invention as applied to an image recording apparatus.
Figure 14:
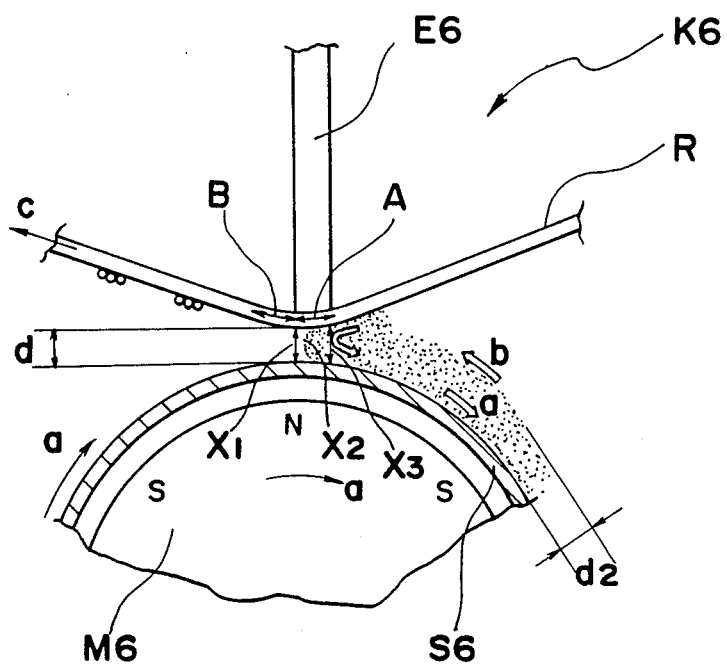
FIG. 14 is a fragmentary side sectional view showing on an enlarged scale, an essential portion of the developing apparatus of FIG. 13.

Reference is made to FIGS. 13 and 14 showing a sixth embodiment in which the developing apparatus of the present invention is applied to an image recording apparatus K6 as referred to above.

The image recording apparatus K6 in FIGS. 13 and 14 includes a rotatable electrically conductive sleeve S6 grounded as a developing electrode, a magnet roller M6 sequentially magnetized with N and S poles on its peripheral surface and rotatably provided within the sleeve S6, a recording electrode E6 provided above and adjacent to the peripheral surface of the sleeve S6 through a predetermined interval so as to form a recording region X, and a developing material casing H6 provided, at its open portion adjacent to the side of the sleeve S6, while a scraper T6 is fixed to the casing H6 so as to contact, at its forward edge, the peripheral surface of said sleeve S6 under pressure.

The sleeve S6 is driven for rotation in the direction of the arrow (a) at a comparatively low speed, while the magnet roller M6 is also rotated in the same direction of the arrow (a) at a relatively high speed. Within the casing H6, a developing material supply vane N6 is provided so as to be driven for rotation in the direction of the arrow (d), while the upper edge at the open portion of the casing H6 confronting the surface of the sleeve S6 functions as a bristle height restricting plate L6 for the developing material.

Meanwhile, a recording medium, e.g., a plain paper sheet in this case, is transported from the right side in FIG. 13 in the direction of the arrow (c), and is adapted to pass through the recording region X, with the back surface thereof contacting the underface of the recording electrode E6.

Hereinbelow, specific numerical values for the above image recording apparatus will be described based on the experiments carried out by the present inventors.

SLEEVE

Diameter: 31 mm
Revolutions: 60 rpm.

MAGNET ROLLER

Number of poles: 8

Magnetic force: 750 G (on the sleeve surface)
Revolutions: 1200 rpm
Interval d1 at the closest position: 0.4 mm
Interval d2 for the bristle height restriction: 1.5 mm
Developing material: mono-component developing material composed of a magnetic toner.

Subsequently, movement of the developing material in the image recording apparatus K6 as described so far will be explained.

Based on the rotation of the supply vane N6 in the direction of the arrow (d), the developing material is fed onto the peripheral surface of the sleeve S6. As observed on the whole, the developing material is transported over the peripheral surface of the sleeve S6 in the direction of the arrow (b) opposite to the rotating direction of the magnet roller M6, while being restricted for its bristle height by the bristle height restricting portion L6. In this case, the bristle height d2 of the developing material is equal to the interval between the forward edge of the bristle height restricting portion L6 and the surface of the sleeve S6.

Upon investigation into the state of transportation as described above in detail, it is seen that in the system as in the present invention in which the developing sleeve and the magnet roller are driven for rotation in the same direction, the upper portion of the magnetic brush is transported in the direction opposite to the rotating direction of the magnet roller M6 through movement of the magnetic field on the rotation of said magnet roller M6.

On the other hand, the lower portion of the magnetic brush close to the peripheral surface of the developing sleeve S6 is transported in the rotating direction of the developing sleeve S6 following the rotation thereof, i.e., in the direction opposite to the transport direction on the whole. However, the transport speed thereof is lower than the transport speed at the upper portion of the magnetic brush.

Meanwhile, the recording medium R is transported in the direction of the arrow (c), with its back face contacting the recording electrode E6, and the developing material contacts the recording surface at the recording region X. Simultaneously, the image signal voltage is applied to the recording electrode E6, and the developing material (toner) is injected with an electrical charge based on the electric field between the recording electrode E6 and the sleeve S6. Thus, the toner at the forward end of the magnetic brush is charged to a polarity opposite to that of the image signal, and adheres onto the recording surface of the recording medium R in the form of a toner image corresponding to the image signal.

In the above case, the position X2 where the developing material completes the contact with respect to the recording surface of the recording medium R is a position at which the surface of the developing sleeve S6 is approaching the corresponding recording surface of the recording medium R and which is located slightly closer to the upstream side than the closest position X1 between the surfaces of the developing sleeve S6 and the recording medium R.

The closest position X1 referred to above is the position corresponding to the left end of the recording electrode E6 in FIG. 14, and the region A where the electric field is formed between the recording electrode E6 and the sleeve S6 is gradually narrowed from the position X3 corresponding to the right end of the recording electrode E6 toward the closest position X1. Thus, the position X2 at which the developing material completes the contact with respect to the recording surface of the recording medium R is located within the electric field region A. Accordingly, when the recording medium R transported in the direction of the arrow (c) has reached the region B free from any influence of the electric field by the voltage impression to the recording electrode E6, there is no possibility that the developing material contacts the recording surface of the recording medium R.

When the experiment of image recording was effected through employment of the image recording apparatus K-6 as described so far, favorable recorded images could be obtained, without discharge of the toner charge. Such effect may be attributable to the fact that, when the recording medium R has reached the non-electric field region B so as to be out of the influence by the electric field due to the voltage impression to the recording electrode E6, there is no possibility that the developing material contacts the recording surface of the recording medium R. More specifically, the electrical charge of the charged toner is not discharged through the toner layer, thus the force for retaining the toner on the recording surface of the recording medium R not being weakened, and scraping off of the developed toner by the magnetic brush, lowering or instability of recording density, etc. do not take place. Additionally, at the electric field region A, owing to the fact that the developing is effected, with the developing material contacting the recording surface of the recording medium R, a sufficient recording density can be obtained even when the image signal voltage is not very high, and it is needless to say that the fine line reproducibility is not impaired, since the toner never flies in the air.

Figure 15:
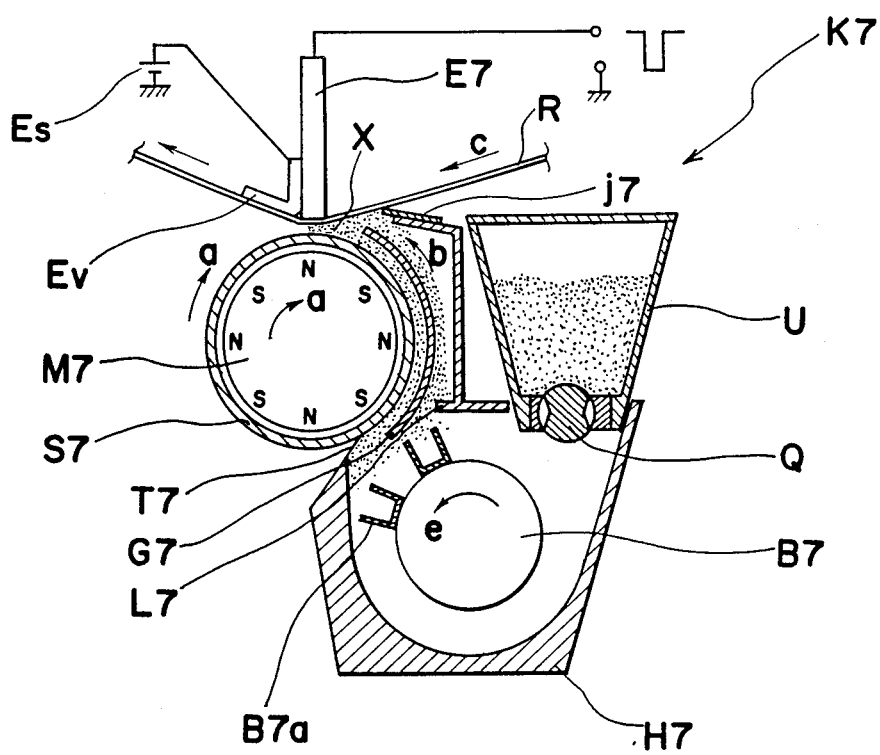
FIG. 15 is a schematic side sectional view showing a developing apparatus according to a seventh embodiment of the present invention.
Figure 16:
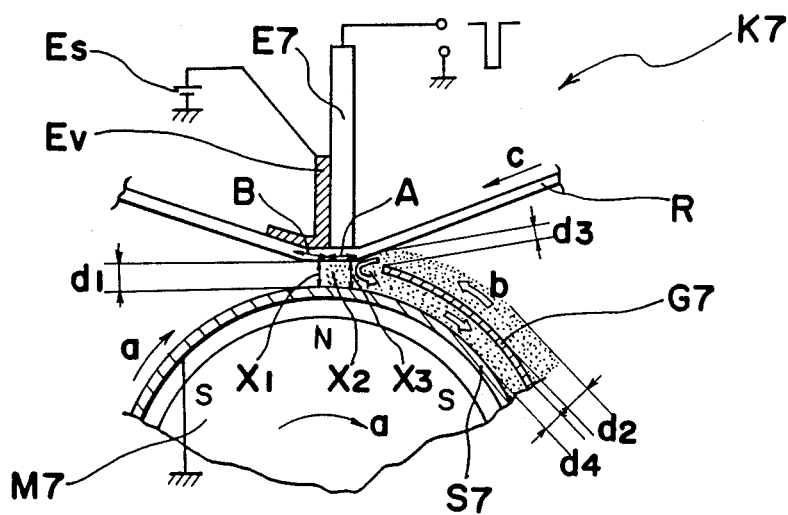
FIG. 16 is a fragmentary side sectional view shown on an enlarged scale, an essential portion of the developing apparatus of FIG. 15.

Referring further to FIGS. 15 and 16, there is shown a developing apparatus K7 according to a seventh embodiment of the present invention.

The developing apparatus K7 which employs a two-component developing material composed of a mixture of magnetic carrier and toner, generally includes a sleeve S7 rotatably provided for rotation in the direction of the arrow (a), a magnet roller M7 sequentially magnetized with N and S poles and rotatably provided with the sleeve S7 for rotation also in the direction of the arrow (a), a developing material transport guide member G7 of an arcuate cross section provided adjacent to the side of the sleeve S7 through a predetermined interval therefrom, a recording electrode E7 provided above and adjacent to the peripheral surface of the sleeve S7 so as to form a recording region X therebetween, another electrode Ev of a V-shaped cross-section connected to a power source Es and disposed adjacent to the recording electrode E7 at the downstream R so as to be impressed with a voltage of the same polarity as that for the toner charge, and a developing material casing H7 disposed to surround the guide member G7 at its open end, and provided therein with a rotatable bucket roller B7 with buckets B7a, and a toner hopper U containing replenishing toner and disposed at the upper portion of said casing H7.

The developing material guide member G7 is made of an electrically insulative material or electrically conductive material supported to achieve electrical insulation and is disposed concentrically with the sleeve S7 to extend from the upper opening of the developing material casing H7 to the recording region X.

The upper portion of the developing material casing H7 extends upwardly to cover the developing material transport region, and has a sealing member j7 of an elastic material attached to the upper portion thereof, with the forward edge of the sealing member j7 being arranged to contact the recording surface of the recording member R. It is so arranged that the toner within the hopper U is fed into the casing H7 through the known automatic toner concentration control device by the rotation of a toner supply roller Q provided at the bottom portion of the hopper U for a predetermined period of time.

It is to be noted here that the specific values of the above image recording apparatus K7 are generally the same as those in the previous embodiment of FIGS. 13 and 14, and the interval d3 between the forward edge of the guide member G7 and the recording surface of the recording member R is set to 1.2 mm, while the interval d4 between the surfaces of the guide member G7 and the sleeves S7 is also set to 1.2 mm.

In the apparatus K7 also, the relation (4) referred to earlier for avoiding presence of the developing material on the outer peripheral surface of the developing sleeve S7 at the downstream side beyond the closest position X1 is of course satisfied.

Subsequently, movement of the developing material in the apparatus K7 of FIGS. 15 and 16 described so far will be explained.

The developing material is supplied onto the peripheral surface at the lower end of the developing material transport guide member G7 through rotation of the bucket roller B7 in the direction of the arrow (e), and is transported over the guide member G7 in the direction of the arrow (b) based on the rotation of the magnet roller M7 in the direction of the arrow (a), while being restricted for its bristle height by a bristle height restricting portion L7, in which case, the bristle height d2 of the developing material is equal to the interval between the forward edge of the bristle height restricting portion L7 and the corresponding outer surface of the guide member G7. Thus, the developing material is brought into contact with the recording surface of the recording medium R fed in the direction of the arrow (c), almost at the same time as said developing material is transferred from the forward edge of the guide member G7 onto the peripheral surface of the sleeve S7.

The image signal voltage is applied to the recording electrode E7 in the similar manner as in the apparatus K6 in the sixth embodiment, and the charged toner adheres to the recording surface of the recording medium R as the toner image corresponding to the image signal. Simultaneously, the voltage in the same polarity as that of the charge for charging the toner is applied to the electrode Ev. Thereafter, the developing material is transported between the sleeve S7 and the guide member G7 in the direction of the arrow (a) as the sleeve S7 is rotated in the same (a) direction, and is scraped off by a scraper T7 so as to be returned into the casing H7.

Similar to the case as in the sixth embodiment, in the above case also, the position X2 where the developing material completes the contact with respect to the recording surface of the recording medium R is a position at which the surface of the developing sleeve S7 is approaching the corresponding surface of the recording medium R and which is located slightly closer to the upstream side than the closest position X1 between the surfaces of the developing sleeve S7 and the recording medium R. More specifically, as described earlier, the region A where the electric field is formed between the recording electrode E7 and the sleeve S7 is gradually narrowed from the position X3 corresponding to the right end of the recording electrode E7 toward the closest position X1. Thus, the position X2 at which the developing material completes the contact with respect to the recording surface of the recording medium R is located within the electric field region A. Accordingly, when the recording medium R transported in the direction of the arrow (c) has reached the region B free from any influence of the electric field by the voltage impression to the recording electrode E7, there is no possibility that the developing material contacts the recording surface of the recording medium R.

When the experiment of image recording was effected through employment of the apparatus K7 as described so far, favorable recording images could be obtained, without discharge of the toner charge as in the sixth embodiment. Furthermore, since the closest position X1 is present after the development, and from said position toward the downstream side in the recording medium transport direction, the electric field for displacing the toner toward the sleeve S7 is produced through voltage supply to the electrode Ev, even when scattering of toner is produced by the employment of the two-component developing material, the floating toner is attracted toward the sleeve side for adhesion thereto by the electric field. Accordingly, there is no possibility that the floating toner adheres to the recording medium R to form the undesirable fogging or that the interior of the apparatus is soiled by such floating toner.

In the above seventh embodiment, the purpose for providing the developing material transport guide member G7 is to eliminate the lowering of toner concentration in the developing material at the recording region X in the case of the the developing material employing the carrier. More specifically, by the provision of the developing material transport guide member G7 as described above, the developing material before the development transported in the direction of the arrow (b) based on the rotation of the magnet roller M7 is separated from the developing material lowerered in the toner concentration after the development and transported in the direction of the arrow (a) based on the rotation of the developing sleeve S7 by said guide member G7, without any replacement of the developing material between both of the transport passages. Therefore, the forward edge of the guide member G7 should preferably be located close to the recording region X, with lowering of the toner concentration being prevented to a certain extent. Therefore, although the interval d3 between the forward edge of the developing material transport guide member G7 and the surface of the recording medium R is set to be narrower than the bristle height restricting interval d2, the relation may be modified to be $d3 \geq d2$. In short, the conditions may be such that the developing material completes the contact with respect to the recording surface of the recording medium R at least at the closest position X1.

It is also to be noted that the guide member G7 has a function to effect the smooth transport of the developing material. Accordingly, to achieve this effect, such guide member G7 may also be provided in the previous sixth embodiment employing the mono-component developing material.

It should also be noted here that, in the foregoing embodiment, although the present invention has been generally described with reference to the developing apparatuses of the FR system, the concept of the present invention is not limited in its application to such FR system developing apparatus alone, but may be readily applied to a developing apparatus of FF system as in a developing apparatus K8 in an eighth embodiment of the present invention to be described hereinbelow with reference to FIGS. 17 and 18.

Figure 17:
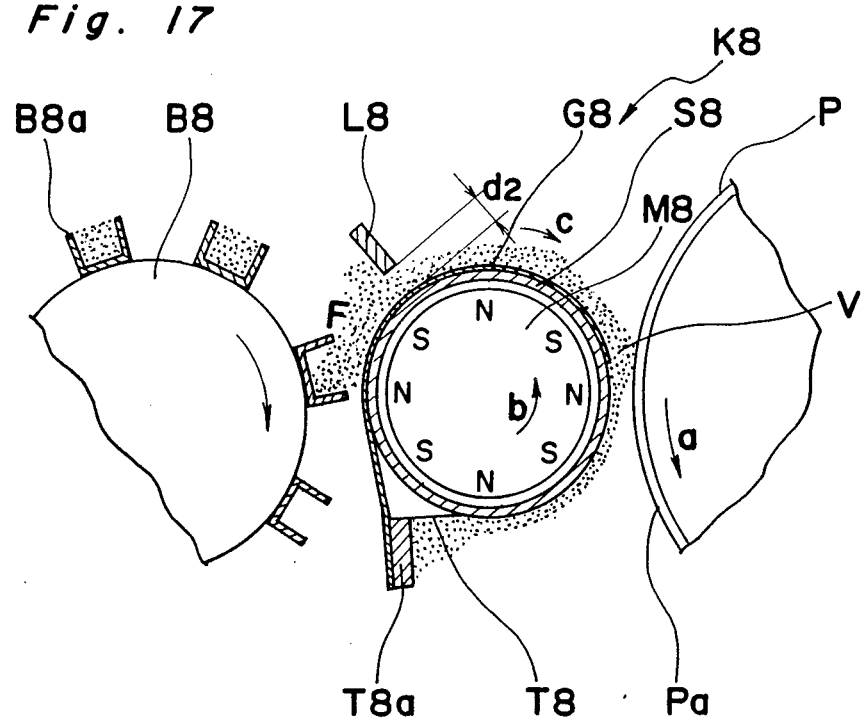
FIG. 17 is a schematic side sectional view showing a developing apparatus according to an eighth embodiment of the present invention.
Figure 18:
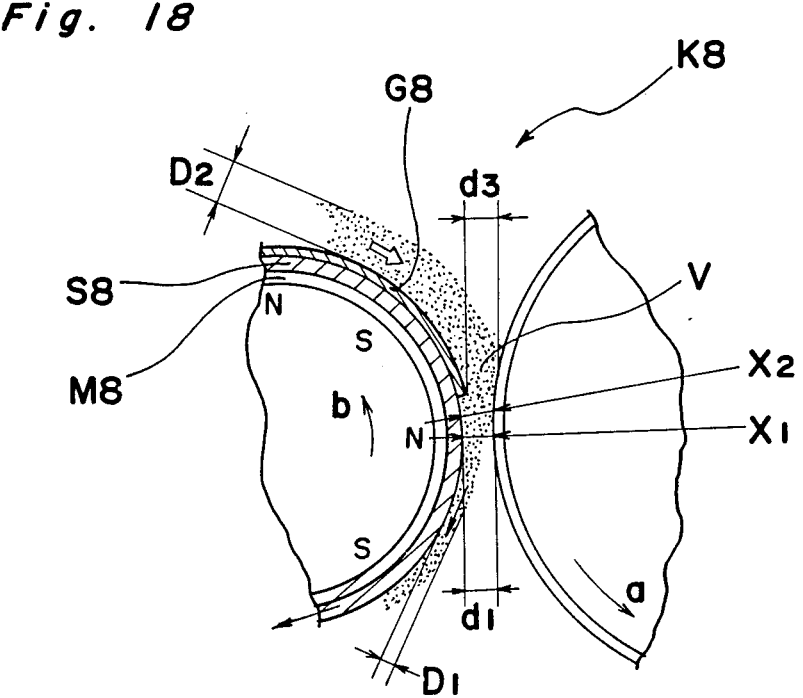
FIG. 18 is a fragmentary side sectional view showing on an enlarged scale, an essential portion of the developing apparatus of FIG. 17.

In FIGS. 17 and 18, the developing apparatus K8 generally includes a developing sleeve S8 formed into a cylindrical shape by an electrically conductive non-magnetic material such as aluminum or the like and rotatably provided to be rotated in the direction of the arrow (c) adjacent to the photosensitive surface Pa of the photoreceptor drum P driven for rotation in the direction indicated by the arrow (a), a magnet roller M8 sequentially magnetized by N and S poles around the circumferential direction thereof and coaxially accommodated within the developing sleeve S8 for rotation in the direction of the arrow (b), a developing material guide plate G8 of a semi-circular cross section provided to contact approximately the upper half of the outer peripheral surface of the developing sleeve S8, a developing material amount restricting plate L8 provided above and adjacent to the surface of the developing sleeve S8 through an interval d2 therebetween, a scraper T8 mounted on a support member T8a and lightly contacting at its forward edge, the lower peripheral surface of the sleeve S8 against the rotating direction (indicated by the arrow (c)) of said sleeve, and a bucket roller B8 rotatably disposed adjacent to the sleeve S8.

The developing material guide plate G8 made of an electrically conductive non-magnetic material, is held at its one end by the support member T8a to extend upwardly therefrom, and reaches the developing region V through the developing material supply portion F, and has a width generally equal to that of the developing sleeve S8. The forward edge of this guide G8 is located in a position slightly at the upstream side of the closest portion X1 between the surfaces of the developing sleeve S8 and the photoreceptor drum P, and an interval d3 between said forward edge and surface Pa of the photoreceptor drum P is set to be smaller than the interval d2 between the restricting plate L8 and the guide plate G8.

The bucket roller B8 having a plurality of buckets B8a provided at equal intervals on its peripheral surface is adapted to supply the developing material scooped up by the buckets B8a to the developing material supply section F based on its rotation in the clockwise direction.

Subsequently, movement of the developing material in the developing apparatus K8 as described so far will be explained hereinbelow.

Since the developing apparatus K8 is of the FF system, the developing sleeve S8 is driven for rotation in the direction of the arrow (c), while the magnet roller M8 is rotated in the direction of the arrow (b) during the development, but the developing material held on the developing material guide plate G8 by the magnetic force of the magnet roller M8 is not subjected to the transport force based on the rotation of the developing sleeve S8. Accordingly, the developing material fed to the developing material over the guide plate G8 in the direction of the arrow (c) based on the rotation of only the magnet roller M8, while being restricted by the restricting plate L8. The developing material transported up to the forward edge of the guide plate G8 contacts the photosensitive surface Pa of the photoreceptor drum P owing to the fact that the interval d3 between said forward edge and the photosensitive surface Pa is smaller than the bristle height D2 (which is equal to the developing material amount restricting interval d2), and thus, develops the electrostatic latent image preliminarily formed on the photoreceptor drum P. Simultaneously, the developing material contacts the peripheral surface of the developing sleeve S8, and is subjected to the transport force based on the rotation of the developing sleeve S8 in addition to the transport force based on the rotation of the magnet roller M8 so as to be transported in the direction of the arrow (c) over the peripheral surface of the developing sleeve S8, and then, scraped off said peripheral surface by the scraper T8 for being returned into the developing tank (not shown here).

More specifically, the developing material transported over the developing material guide plate G8 with the bristle height D2 is increased in its transport speed when it is transferred onto the outer peripheral surface of the developing sleeve S8 after the developing, and according to the amount of such speed increase, the bristle height D1 is reduced. In this case, the interval d1 at the closest position X1 between the surfaces of the developing sleeve S8 and the photoreceptor drum P is set to be larger than the developing material bristle height D1 on the outer peripheral surface of the developing sleeve S8. Accordingly, the developing material is to complete its contact with respect to the surface Pa of the photoreceptor drum P at the position X2 where the developing sleeve S8 is approaching the surface Pa of said photoreceptor drum P.

Hereinbelow, specific numerical values for the developing apparatus K8 and developing process according to the present invention will be described based on the experiments carried out by the present inventors.

DEVELOPING SLEEVE

Diameter: 31 mm
Revolutions: 80 rpm
Developing bias: +150 V (DC).

MAGNET ROLLER

Number of poles: 8
Magnetic force: 1000 G (on the surface of the developing sleeve)
Revolutions: 1300 rpm.

DEVELOPING MATERIAL GUIDE PLATE

Material: non-magnetic stainless steel
Thickness: 0.1 mm
Interval d1 at closest position between the developing sleeve and photoreceptor drum: 0.7 mm
Interval d2 for the developing material amount restriction: 1.2 mm
Interval d3 between the developing material guide plate forward edge and the photoreceptor drum surface: 1.0 mm
Bristle height D2 on the developing material guide plate: 1.2 mm (equal to d2)
Bristle height D1 on the developing sleeve S8: about 0.4 mm.

PHOTORECEPTOR DRUM

Circumferential speed: 130 mm/sec
Electrostatic latent image highest potential: +500 V.

DEVELOPING MATERIAL

A mixture of 90% by weight of binder type insulative magnetic carrier having an average particle diameter of 38 μm and 10% by weight of insulative non-magnetic toner having an average particle diameter of 11 μm. In the triboelectrical charging, the carrier is charged to the positive polarity, while the toner is charged to the negative polarity.

When copying experiments were carried out by the copying apparatus employing the developing apparatus and conditions of the present invention as described so far, favorable copied images free from fogging or blurring of toner, etc. could be obtained without deterioration, or the fine line reproducibility or adhesion of carrier to the surface of the photoreceptor drum. Moreover, even when a continuous copying for 10,000 sheets was effected, leakage of toner was hardly noticed from between the developing tank and the photoreceptor drum.

The effect as described above is considered to be attributable to the fact that the position X2 where the developing material completes the contact with respect to the photoreceptor drum P is located at the upstream side of the closest position X1. More specifically, after completion of the contact with respect to the developing material, the surface Pa of the photoreceptor drum P is to pass the closest position X1 where the electric field between the electrostatic latent image on the photoreceptor drum P and the developing sleeve S8 is the strongest. The floating toner leaving the carrier due to its small charge amount is attracted onto the image portion by the strong electric field when said image portion passes, and onto the developing sleeve S8 as the background portion for the image portion is passing, and respectively adheres to the image portion on the surface Pa of the photoreceptor drum P or to the outer peripheral surface of the developing sleeve S8. Accordingly, there is no such inconvenience that the floating toner adheres to the background portion to form the undesirable fogging or leaks out of the developing apparatus.

Meanwhile, at the developing region V, since the electric field between the developing sleeve S8 and the photoreceptor drum P is the strongest at the position X2 where the contact of the developing material is completed, there is no possibility that the carrier scrapes off, at the position X2, the toner having adhered to the image portion prior to the arrival at the position X2, and thus, blurring of the toner images, faulty reproduction of fine lines, etc. do not take place.

Moreover, even when the carrier has a small magnetic restricting force since it is of the binder type with a small diameter as in the present embodiment, adhesion of the carrier does not readily take place owing to the fact that the magnetic field at the termination of contact of the developing material is the maximum.

It should be noted here that, in the above electrostatic latent image developing apparatus K8, the forward edge position of the developing material guide plate G8 may be so modified to be set at the closest position X1, instead of being located at the approaching position X2, and even in this modification, the effect as stated previously may be achieved, and also that, besides the two-component developing material composed of the mixture of toner and carrier as employed in the present embodiment, a mono-component developing material composed only of toner may be employed.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A developing apparatus which comprises a developing sleeve rotatably provided to confront an object to be developed, a magnet roller incorporated within said developing sleeve so as to be driven for rotation in the same direction said developing sleeve, and a supply means for supplying developing material onto the peripheral surface of said developing sleeve at a developing section, said developing apparatus being so arranged as to satisfy such conditions as $$D \cdot \pi \cdot Wsl > d1 \cdot p \cdot Wmg$$

where
   D: developing sleeve diameter (mm)
   Wsl: developing sleeve revolutions (rpm)
   d1: the closest distance between the sleeve surface and the object to be developed
   p: number of poles of the magnet roller
   Wmg: revolutions of the magnet roller (rpm);
      said developing material being returned toward said supply means prior to reaching the closest distance between the sleeve surface and the object to be achieved.

2. A developing apparatus as claimed in claim 1, further including a developing material amount restricting member provided between a developing material supply portion and a developing region confronting the object to be developed so as to restrict the amount of the developing material transported over the developing sleeve.

3. A developing apparatus as claimed in claim 2, further including a developing material guide member having a configuration generally lying along the peripheral surface of the developing sleeve through a predetermined interval therefrom and extending from the developing material supply portion to the developing region.

4. A developing apparatus as claimed in claim 3, wherein an interval between the forward edge of the developing material guide member and the object to be developed is smaller than an interval between said developing material amount restricting member and said developing material guide member.

5. A developing apparatus as claimed in claim 3, wherein the developing material is a two-component developing material composed of magnetic carrier and toner.

6. A developing apparatus as claimed in claim 1, wherein the developing material is composed of only magnetic toner.

7. A developing apparatus as claimed in claim 1, wherein the object to be developed is of a photoreceptor supporting an electrostatic latent image thereon.

8. A developing apparatus as claimed in claim 1, wherein the object to be developed is a recording paper supported by a recording electrode from its back.

9. A developing apparatus comprising:
   a developing sleeve rotatably provided to confront an object to be developed;

a supply means for supplying developing material onto the peripheral surface of said developing sleeve;

a developing material guide member extending generally along the peripheral surface of the developing sleeve through a predetermined interval, from a developing material supply portion toward a position where the developing sleeve is approaching the object to be developed;

a magnet roller incorporated within said developing sleeve so as to be driven for rotation in the same direction as said developing sleeve, whereby the developing material on the developing sleeve is transported in a predetermined direction and the developing material on the guide member in the direction opposite to the predetermined direction; and a developing material amount restricting member for restricting the amount of the developing material transported over the surface of the developing material guide member, said developing material amount restricting member being disposed to confront said developing material guide member through an interval larger than an interval between the forward edge of said developing material guide member and the object to be developed.

10. A developing apparatus as claimed in claim 9, wherein said developing sleeve and magnet roller are so set as to satisfy such conditions as $$D \cdot \pi \cdot Wsl > d1 \cdot p \cdot Wmg$$

where
D: developing sleeve diameter (mm)
Wsl: developing sleeve revolutions (rpm)
d1: the closest distance between the sleeve surface and the object to be developed
p: number of poles of the magnet roller
Wmg: revolutions of the magnet roller (rpm).

11. A developing apparatus as claimed in claim 9, further including a scraper contacting under pressure, the peripheral surface of the developing sleeve in a position opposite to the developing region.

12. A developing apparatus as claimed in claim 9, wherein the developing material is of a two-component developing material composed of magnetic carrier and toner.

13. A developing apparatus which comprises a developing sleeve rotatably provided to confront an object to be developed, a magnet roller incorporated within said developing sleeve so as to be driven for rotation in a direction opposite to that of said developing sleeve, a supply means for supplying developing material onto the peripheral surface of said developing sleeve, a developing material guide member extending generally along the peripheral surface of the developing sleeve, from a developing material supply portion toward a position where the developing sleeve is approaching the object to be developed, and a developing material amount restricting member for restricting the amount of the developing material transported over the surface of the developing material guide member, said developing material amount restricting member being disposed to confront said developing sleeve through an interval larger than an interval between the forward edge of said developing material guide member and the object to be developed.

14. A developing apparatus as claimed in claim 13, wherein said developing material guide member is provided to contact the peripheral surface of said developing sleeve.

* * * * *